United States Patent
Gebhardt et al.

(10) Patent No.: US 10,453,080 B2
(45) Date of Patent: Oct. 22, 2019

(54) OPTIMIZING REGISTRATION FIELDS WITH USER ENGAGEMENT SCORE

(71) Applicant: International Business Machines Corporation, Armonk, NY (US)

(72) Inventors: Richard A. Gebhardt, Raleigh, NC (US); ChunHui Y. Higgins, Raleigh, NC (US); William P. Higgins, Durham, NC (US); Peter J. Parente, Durham, NC (US); Ke Zhu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 15/008,235

(22) Filed: Jan. 27, 2016

(65) Prior Publication Data
US 2017/0213225 A1   Jul. 27, 2017

(51) Int. Cl.
G06Q 10/00   (2012.01)
G06Q 30/02   (2012.01)
G06Q 30/00   (2012.01)

(52) U.S. Cl.
CPC ....... G06Q 30/0201 (2013.01); *G06Q 30/012* (2013.01)

(58) Field of Classification Search
None
See application file for complete search history.

(56) References Cited

U.S. PATENT DOCUMENTS

| | | | |
|---|---|---|---|
| 8,140,515 B2 * | 3/2012 | Pradhan | G06F 16/93 707/711 |
| 8,626,818 B2 * | 1/2014 | Suresh | H04L 51/38 455/418 |
| 8,645,209 B2 | 2/2014 | Mandyam et al. | |
| 8,892,649 B2 * | 11/2014 | Gopinath | G06Q 30/02 709/204 |
| 9,983,775 B2 * | 5/2018 | Jain | G06F 3/0482 |
| 2003/0105659 A1 * | 6/2003 | Eisenstein | G06Q 30/02 705/7.32 |
| 2004/0267743 A1 * | 12/2004 | Dasari | G06F 16/215 |

(Continued)

OTHER PUBLICATIONS

Vaughan, Pamela, How Long Should Your Landing Page Forms Be?, Mar. 27, 2012, HubSpot Blog, https://web.archive.org/web/20120504041417/https://blog.hubspot.com/blog/tabid/6307/bid/32079/how-long-should-your-landing-page-forms-be.aspx, p. 1-6.*

(Continued)

*Primary Examiner* — Joseph M Waesco

(74) *Attorney, Agent, or Firm* — Shumaker & Sieffert, P.A.

(57) ABSTRACT

Techniques are described for collecting customer data through a software application in order to optimize registration form to maximize registration success rates, based on a user engagement score related to user's interest, needs, registration behavior patterns, and source of user. In some examples, a method includes evaluating user data indicating interactions of a user with a software application. The method further includes determining a user engagement score for the user based at least in part on the user data. The method further includes determining, based at least in part on the user engagement score, a number and a type of one or more registration fields. The method further includes outputting the one or more registration fields to a display device based at least in part on a triggering event.

12 Claims, 7 Drawing Sheets

(56) References Cited

U.S. PATENT DOCUMENTS

| | | | |
|---|---|---|---|
| 2006/0007189 A1* | 1/2006 | Gaines, III | G06F 17/243 345/179 |
| 2008/0050043 A1* | 2/2008 | Hermosillo Valadez | G06K 9/6206 382/294 |
| 2010/0293221 A1 | 11/2010 | Sidman et al. | |
| 2014/0052502 A1* | 2/2014 | Razvi | G06Q 10/06393 705/7.39 |
| 2014/0079338 A1* | 3/2014 | Siewerdsen | G06T 3/0068 382/284 |
| 2015/0334469 A1* | 11/2015 | Bhatia | H04N 21/252 725/32 |
| 2015/0358667 A1* | 12/2015 | Bhatia | H04N 21/252 725/14 |
| 2016/0007083 A1* | 1/2016 | Gurha | H04N 21/44222 725/13 |
| 2016/0088333 A1* | 3/2016 | Bhatia | H04N 21/252 725/34 |
| 2016/0180248 A1* | 6/2016 | Regan | G09B 5/00 706/12 |
| 2016/0260123 A1* | 9/2016 | Mishra | G06Q 30/0244 |
| 2017/0039502 A1* | 2/2017 | Guman | G06Q 50/22 |

OTHER PUBLICATIONS

Aragon, How to Optimize Registration Forms [Infographic], The Daily Egg, Apr. 12, 2013, Retrieved from <http://blog.crazyegg.com/2013/04/12/optimize-registration-forms-infographic/> 6 pgs.

McKee, "Optimize Your Event Registration Form to Increase Attendee Registration," surveygizmo, Nov. 6, 2013, Retrieved from <http://www.surveygizmo.com/survey-blog/how-to-optimize-your-event-registration-form/> 12 pgs.

Sharan et al., "How to Optimize a Webinar Registration and Confirmation Page," Webinars for Dummies, Retrieved from <http://www.dummies.com/how-to/content/how-to-optimize-a-webinar-registration-and-confirm.html> on Jan. 27, 2016, 3 pgs.

* cited by examiner

CLIENT COMPUTING DEVICE 16A/17A

WEB APPLICATION USER INTERFACE
27

REGISTRATION OPTIMIZATION OUTPUT
39

START YOUR FREE 45 DAY TRIAL

TRY IT NOW >

TRY OUR SOFTWARE NOW FOR FREE WITH NO COMMITMENTS
AND NO CREDIT CARD

FIRST NAME — 510A

LAST NAME — 510B

EMAIL — 510C

PHONE — 510D

COMPANY — 510E

TITLE — 510F

COUNTRY:
— 510G

WHAT IS YOUR ROLE IN YOUR COMPANY?
DEVELOPER — 510H

EMPLOYEES:
1-5 EMPLOYEES — 510J

WHERE DID YOU HEAR ABOUT OUR SOFTWARE?
SEARCH ENGINE — 510K

WHAT INDUSTRY BEST FITS YOUR COMPANY?
AUTOMOTIVE — 510L

☑ I AGREE TO THE TERMS OF SERVICE

OPTIMIZING REGISTRATION FIELDS WITH USER ENGAGEMENT SCORE

TECHNICAL FIELD

This disclosure relates to collecting customer data through a software application.

BACKGROUND

Data related to current customers and potential customers can be very valuable to a software provider. A software provider may acquire this customer data by requesting customer data through a software application. For example, if a potential customer downloads a free software trial offered by a provider through its website, the provider can request information from the potential customer. Some potential customers tend to be cautious about providing their personal information to a software provider, particularly for a software product or a software provider with which they're not yet very familiar. Therefore, abandonment rates for free software trials and website registrations may be significant.

A software provider may face the challenge of maximizing the amount and quality of customer data that it collects from current and potential customers through its software and website. The software provider may also want to minimize the percentage of customers that abandon the registration process. At the same time, the software provider may seek to maximize the amount of customer data that it requests and receives from each visitor.

A user visiting a website may encounter a request from the website for the user's personal information (i.e., customer data). The website may generate and display identical requests for customer data for every user. In addition, the website may require customer data at the beginning of every user's session or at random times. The abandonment rate for a registration process may be significant since users may be cautious about providing personal information before being better able to evaluate whether the software product is worth their attention.

A registration process for a software application such as a website may request too much or too little customer data from users. Some users tend to avoid providing several items of personal information to the website. Other users may provide all of the customer data that the website requests. By using a registration process that does not tailor its requests, a website may alienate some cautious users while unnecessarily limiting the scope of requested customer data from other users who are already more highly engaged with the product.

SUMMARY

In general, techniques of this disclosure are directed to optimizing the number and type of registration fields that a software application, such as a website, displays to a user in order to obtain customer data from the user. These techniques optimize the success rate for a registration process by using registration fields that are based on a user engagement score. Techniques of this disclosure may enable users to provide personal information incrementally and at appropriate times, in response to the user engaging with and coming to appreciate the worth of the software product, rather than in a single, upfront, all-or-nothing registration form. The calculation of the user engagement score may be through evolutionary machine learning method and may be based on the interests, needs, registration abandonment behavior patterns, and source of the user, which may be based on related metrics from a web analytics tool and online activities by the user.

In some examples, a registration optimization system that includes one or more processing devices may examine user data that includes characteristics relating to the interactions of a user with a software application. These characteristics may include the interests, needs, registration abandonment behavior patterns, and source of the user. The registration optimization system may aggregate several pieces of data relating to these characteristics using a registration optimization model. The registration optimization system may apply the registration optimization model to the user data to generate a user engagement score that may, in some examples, represent the strength and frequency of the user's interactions with the software application. The registration optimization system may use the user engagement score to optimize the number and type of registration fields to display to the user.

In one aspect of the invention, a method includes evaluating, with one or more processing devices, user data indicating interactions of a user with a software application. The method further includes determining, with the one or more processing devices, a user engagement score for the user based at least in part on the user data. The method further includes determining, with one or more processing devices, based at least in part on the user engagement score, a number and a type of one or more registration fields. The method further includes outputting, with the one or more processing devices, the one or more registration fields to a display device based at least in part on a triggering event. There is a problem of low user registration success rates that can be caused by untailored and improperly tailored registration requests. The method may solve this problem by tailoring registration fields to the interests, needs, and source of the user, thereby achieving a higher success rate, among other advantages.

Optionally, the method may further include outputting, with the one or more processing devices, the one or more registration fields to a display device based at least in part on a triggering event. With these optional features, the method may optimize the timing of requests for customer data, rather than requesting customer data at the same time for every user.

Optionally, the method may further include querying, with the one or more processing devices, registration data indicating abandonment rates of prior users. The method may further include applying, with the one or more processing devices, a registration optimization model to the user data and the registration data. With these optional features, the method may become an evolutionary, data-driven process that learns from past experience the groups of registration fields that may work best in the future.

Optionally, the method may further include applying, with the one or more processing devices to multi-factor data for user interests, user needs, and user source, a registration optimization model that specifies respective weights for factors of the multi-factor data. The method may further include applying a machine learning algorithm to registration data indicating registration abandonment behavior patterns of prior users. The method may further include using an output from the machine learning algorithm based on the registration abandonment behavior patterns of the prior users to determine the respective weights for factors of the multi-factor data. With these optional features, the method may become an evolutionary, data-driven process that learns from past experience the groups of registration fields that may work best in the future. Moreover, the machine learning algorithm may automatically optimize the registration optimization model as new registration data becomes available.

In another aspect, a method includes querying, with one or more processing devices, user data indicating interactions of a user with a software application. The method further includes applying, with the one or more processing devices, a registration optimization model to the user data to determine a user engagement score. The method further includes generating, with the one or more processing devices, based at least in part on the user engagement score, a registration optimization output comprising a number and a type of one or more registration fields. The method further includes outputting, with the one or more processing devices, the one or more registration fields to a display device based at least in part on a triggering event.

In another aspect, a computer program product includes a computer-readable storage medium having program code embodied therewith. The program code is executable by a computing device to evaluate user data indicating interactions of a user with a software application. The program code is further executable by a computing device to determine a user engagement score for the user based at least in part on the user data. The program code is further executable by a computing device to determine, based at least in part on the user engagement score, a number and a type of one or more registration fields.

In another aspect, a computer system includes one or more processors, one or more computer-readable memories, and one or more computer-readable storage mediums. The computer system further includes program instructions, stored on at least one storage device for execution by at least one processor via at least one memory, to evaluate user data indicating interactions of a user with a software application. The computer system further includes program instructions, stored on at least one storage device for execution by at least one processor via at least one memory, to determine a user engagement score for the user based at least in part on the user data. The computer system further includes program instructions, stored on at least one storage device for execution by at least one processor via at least one memory, to determine, based at least in part on the user engagement score, a number and a type of one or more registration fields.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 5 depicts a screenshot of an example registration optimization output that includes several registration field boxes, in some examples of this disclosure.

DETAILED DESCRIPTION

Figure 1:
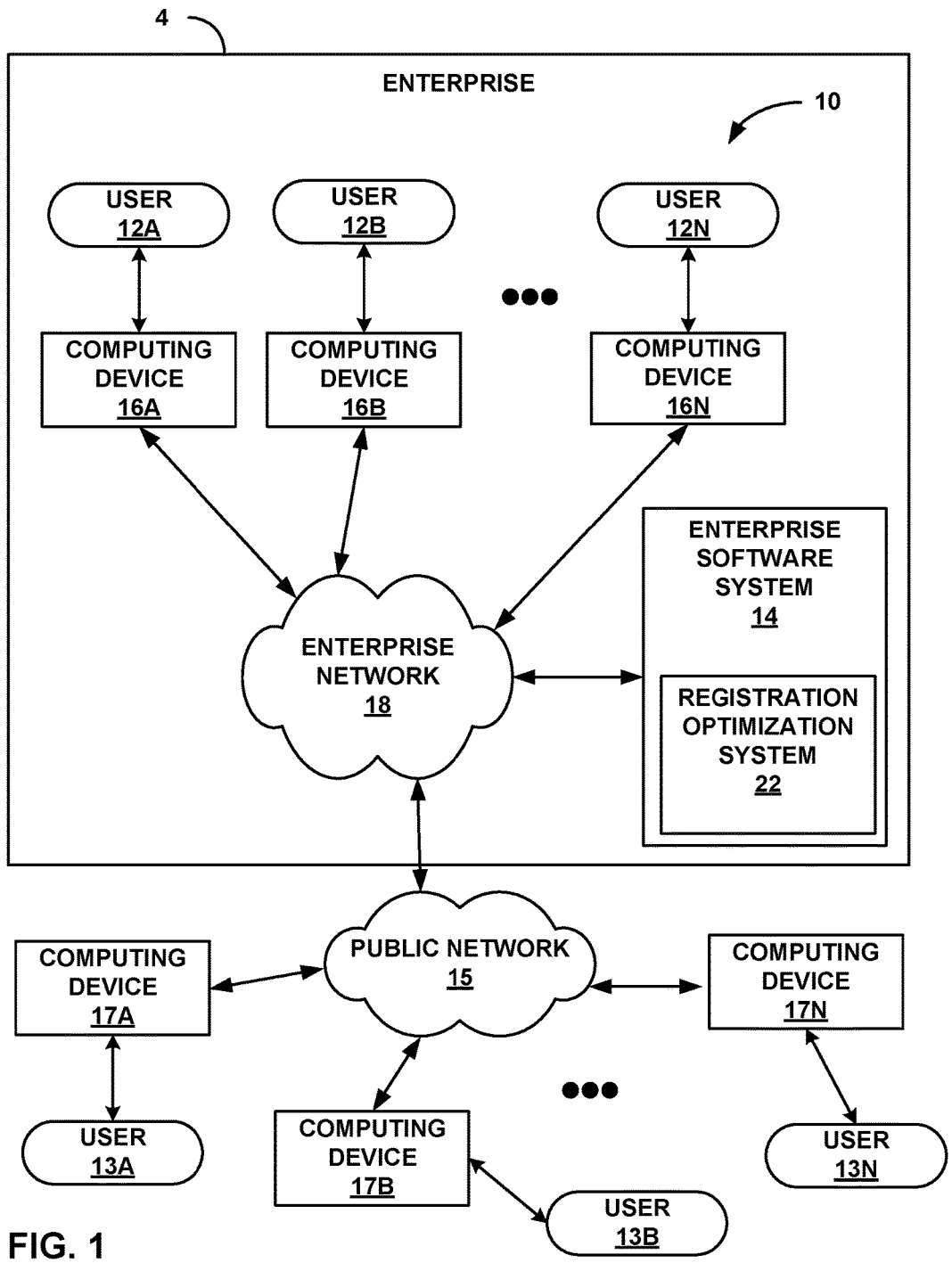
FIG. 1 shows a block diagram illustrating an example system that may optimize registration fields, in some examples of this disclosure.

In general, this disclosure describes techniques implemented by a registration optimization system comprising one or more processing devices to evaluate user data indicating interactions of a user with a software application such as a website. The user data may include information relating to the interests, the needs, and the source of the user. In some examples, the registration optimization system may evaluate user interests by measuring the number of page views, the duration of page views, click path depth, recency of interactions, consistency, feedback, completion of a progression milestone, and other variables relating to interactions. The registration optimization system may evaluate user needs by measuring the number of forum questions posted by the user, the number of forum questions viewed by the user, forum searches, forum replies to answers, and forum ratings. The registration optimization system may evaluate the user source by determining whether the user was referred from a specific marketing program, a website, or a webinar, and by examining user keywords, search history, retargeting tools, and web assets downloading.

The registration optimization system may determine a user engagement score for the particular user based at least in part on the user data. For example, the registration optimization system may determine the user engagement score by first calculating several user engagement subscores. Each subscore may relate to a specific category of information. The subscores may include a click depth index, a recency index, a duration index, a loyalty index, a brand index, a feedback index, an interaction index, a forum activities index, and a marketing program index, among others. In some examples, the registration optimization system may determine the user engagement score by averaging the subscores. In some examples, the registration optimization system may determine the user engagement score by weighting each of the subscores by applying a registration optimization model to the subscores. Thus, the user engagement score may have the advantage of representing the unique characteristics of the user, rather than treating all users as identical. Methods of this disclosure may thus solve problems of problem of low success rates that can be caused by untailored and improperly tailored registration requests by tailoring registration fields to the interests, needs, and source of the user, thereby achieving a higher success rate, among other advantages.

In some examples, the registration optimization system may determine, based at least in part on the user engagement score, a number and a type of one or more registration fields to output to the user for the user to register with the website and/or software. For example, the registration optimization system may output a lower number of registration fields to a user with a lower user engagement score to avoid alienating the user and in order to maximize the likelihood that the user completes the registration process. Each registration field may be a prompt to the user for customer data such as the user's email address, phone number, first name, last name, company, country, and industry segment. The registration optimization model may assign each type of registration field a weight score corresponding to its impact on abandonment rates. Tying the registration fields to the user engagement score has the benefit of tailoring the registration fields to user interests, user needs, and user source, which can improve the success rate for a registration process.

In some examples, the registration optimization system may use a machine learning algorithm to create a registration optimization model by examining the registration abandonment behavior patterns such as registration abandonment rates (i.e., drop-out rates) for past users and past groups of registration fields. A machine learning algorithm may thereby continually improve the registration optimization model as new registration data becomes available.

FIG. 1 shows a block diagram illustrating an example system that may optimize registration fields, in some examples of this disclosure. FIG. 1 shows that registration optimization system 22 may interact with the enterprise network 18 through enterprise software system 14. FIG. 1 illustrates enterprise 4 having a computing environment 10 with a plurality of users 12A-12N within enterprise 4 (collectively, "enterprise users 12" or "users 12") and a plurality of users 13A-13N outside of enterprise 4 (collectively, "external users 13" or "users 13"). Enterprise users 12 may access enterprise software system 14 through enterprise network 18 via external client computing devices 16A-16N (collectively, "enterprise client computing devices 16" or "computing devices 16"). External users 13 may access enterprise software system 14 through public network 15 via external client computing devices 17A-17N (collectively, "external client computing devices 17" or "computing devices 17"). Enterprise 4 may make registration optimization system 22 available to any of enterprise users 12 and/or external users 13.

Registration optimization system 22 may evaluate user data indicating the interactions of user 13A with enterprise software system 14. Computing device 17A may transmit the user data to registration optimization system 22 via a cookie or other tracking mechanism. The interactions of user 13A may include the activities of user 13A while using enterprise software system 14 including user 13A's interactions with web applications and websites. The interactions of the user 13A may include information relating to the interests, needs, and source of user 13A. Registration optimization system 22 may evaluate the interests of user 13A by measuring the number and duration of page views, click path depth, recency of interactions, consistency, feedback, and other interactions. Registration optimization system 22 may evaluate the needs of user 13A by measuring the forum questions posted by user 13A, the forum questions viewed by user 13A, forum searches, forum replies to answers, and forum ratings. Registration optimization system 22 may evaluate the source of user 13A by determining whether user 13A was referred from a specific marketing program, a specific website, or a specific webinar, and by examining user keywords search history, retargeting tools, and web assets downloading. Therefore, registration optimization system 22 may have a more complete understanding of user 13A. Registration optimization system 22 may use this understanding to carefully tailor the registration process to the unique characteristics of user 13A.

Registration optimization system 22 may determine a user engagement score for user 13A based at least in part on the user data for user 13A. Registration optimization system 22 may determine the user engagement score for user 13A by first calculating several subscores. Each subscore may relate to a specific category of information relating to user 13A. The subscores may include a click depth index, a recency index, a duration index, a loyalty index, a brand index, a feedback index, an interaction index, a forum activities index, and a marketing program index, among others. In some examples, Registration optimization system 22 may determine the user engagement score for user 13A by averaging the subscores. In some examples, registration optimization system 22 may determine the user engagement score for user 13A by weighting the subscores through the use of a registration optimization model, which may include one or more algorithms. The registration optimization model may have the advantage of adjusting the algorithms as new registration data becomes available. Accordingly, registration optimization model may be evolutionary and data-driven.

In some examples, registration optimization system 22 may determine, based at least in part on the user engagement score for user 13A, a number and a type of one or more registration fields to output to user 13A for user 13A to register with the software application. For example, registration optimization system 22 may output a lower number of registration fields to user 13A if user 13A has a lower user engagement score in order to maximize the likelihood that user 13A completes the registration process. Each registration field may be a prompt to user 13A for customer data such as user 13A's email address, phone number, first name, last name, company, country, and industry segment. Registration optimization system 22 may use machine learning algorithms to create and calibrate a registration optimization model by examining registration data indicating the abandonment rates or other registration abandonment behavior patterns for prior users 12/13. The registration optimization model may assign each type of registration field a score corresponding to its impact on registration abandonment rates. As used herein, abandonment rate means the percentage of prior users that did not complete the registration process.

In some examples, the techniques of this disclosure may apply to various enterprise software systems 14, including enterprise business intelligence systems or other large-scale enterprise software systems. Examples of enterprise software systems 14 include enterprise financial or budget planning systems, order management systems, inventory management systems, sales force management systems, business intelligence tools, enterprise reporting tools, project and resource management systems, and other enterprise software systems. In some examples, the techniques of this disclosure may apply to websites on enterprise network 18 or public network 15. Websites on enterprise network 18 or public network 15 may relate to enterprise software system 14 and may include forums in which users 12 and users 13 can submit questions, reply to questions, and provide comments.

Users 12, 13 may use a variety of different types of computing devices 16, 17 to interact with enterprise software system 14 and access software applications including web applications and websites via enterprise network 18. For example, an enterprise user 12 may interact with enterprise software system 14 while visiting a website operated by enterprise 4 by using a laptop computer, a desktop computer, or the like. Alternatively, an enterprise user may use a smartphone, tablet computer, or similar device to interact with enterprise software system 14 through a web browser, a dedicated mobile application, or other means for interacting with enterprise software system 14. An external user 13 may also access registration optimization system 22 via a smartphone, tablet computer, or similar device, running an automated build process in a web browser, a dedicated mobile application, or other means for interacting with certain externally surfaced functions of enterprise software system 14.

Enterprise network 18 and public network 15 may represent any communication network, and may include a packet-based digital network such as a private enterprise intranet or a public network like the Internet. In this manner, computing environment 10 can readily scale to suit large enterprises. Enterprise users 12 may directly access enterprise software system 14 via a local area network, or may remotely access enterprise software system 14 via a virtual private network, remote dial-up, or similar remote access communication mechanism.

Figure 2:
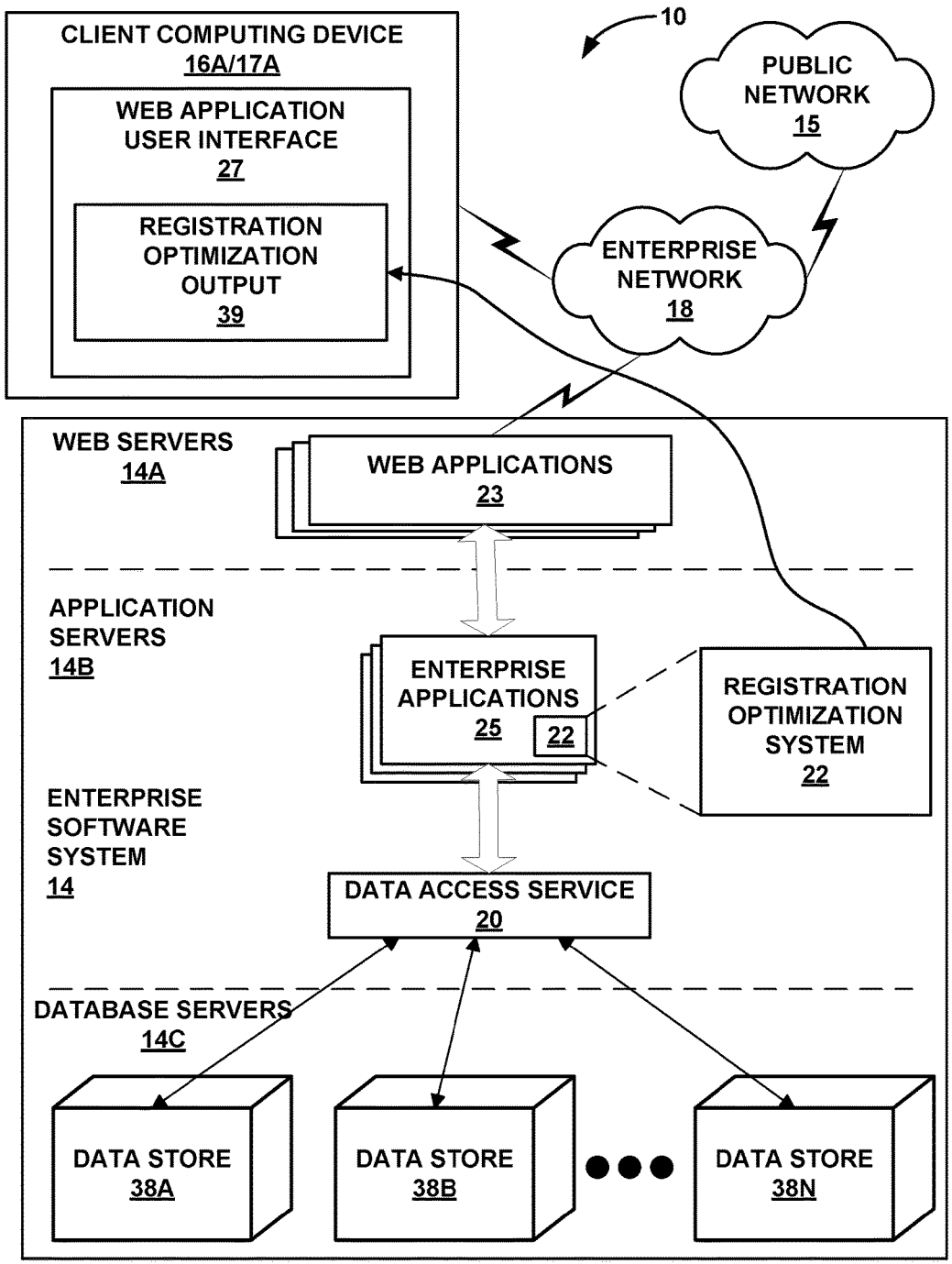
FIG. 2 shows a conceptual block diagram illustrating in further detail portions of a registration optimization system, in some examples of this disclosure.

FIG. 2 shows a conceptual block diagram illustrating in further detail portions of a registration optimization system, in some examples of this disclosure. Registration optimization system 22 may reside within enterprise applications 25, which may be a part of application servers 14B. In some examples, registration optimization system 22 may reside within web applications 23, allowing registration optimization system 22 to evaluate the interactions of a user with a website. In order to determine a user engagement score for a user, registration optimization system 22 may communicate with data access service 20 to acquire user data indicating the user's interactions with a software application. Data access service 20 may query data stores 38 in database servers 14C for the user data. Data stores 38 may contain user data relating to the interests, needs, and source of the user. The user data may include the number and duration of page views, click path depth, recency of interactions, consistency, feedback, and other interactions. After obtaining user data indicating the interactions of a user with a software application from data stores 38, registration optimization system 22 may evaluate the user data and generate a user engagement score.

Web applications 23 and enterprise applications 25 may initially collect the user data that is held in data stores 38 for use by registration optimization system 22 in determining a user engagement score. Web applications 23 and enterprise applications 25 may collect the user data by evaluating user interactions with enterprise software system 14. Users may interact with enterprise software system 14 via public network 15 or enterprise network 18. In some examples, public network 15 and enterprise network 18 may allow users to run web applications 23 on web servers 14A or enterprise applications 25 on application servers 14B.

Registration optimization system 22 may determine a user engagement score by first calculating several user engagement subscores based on the user data obtained from data stores 38. The subscores may include a click depth index, a recency index, a duration index, a loyalty index, a brand index, a feedback index, an interaction index, a forum activities index, and a marketing program index, among others. Registration optimization system 22 may calculate the user engagement subscore by averaging the subscores. In some examples, registration optimization system 22 may use machine learning algorithms to calibrate coefficient weights that are assigned to each of the subscores.

Registration optimization system 22 may be hosted among enterprise applications 25, web applications 23, or elsewhere, including on a client computing device 16A/17A (which may be internal or external to enterprise computing environment), or distributed among various computing resources in enterprise software system 14. Registration optimization system 22 may be implemented as or take the form of a stand-alone application, a portion or add-on of a larger application, a library of application code, a collection of multiple applications and/or portions of applications, or other forms, and may be executed by any one or more servers, client computing devices, processors or processing units, or other types of computing devices. As described above and further below, registration optimization system 22 may be implemented in one or more computing devices, and may involve one or more software applications or web applications that may be executed on one or more processors.

Registration optimization system 22 may determine, based at least in part on the user engagement score, a number and a type of one or more registration fields to output to the user via registration optimization system 22. Each registration field may be a prompt to the user to provide customer data such as the user's email address, phone number, first name, last name, company, country, and industry segment. Registration optimization system 22 may output the number and the type of registration fields to registration optimization output 39 on client computing device 16A/17A. Client computing device 16A/17A may run enterprise applications 26 or web applications 23, and client computing device 16A/17A may display web application user interface (UI) 27. Web application UI 27 may include registration optimization output 39 to request one or more items of customer data from the user.

Figure 3:
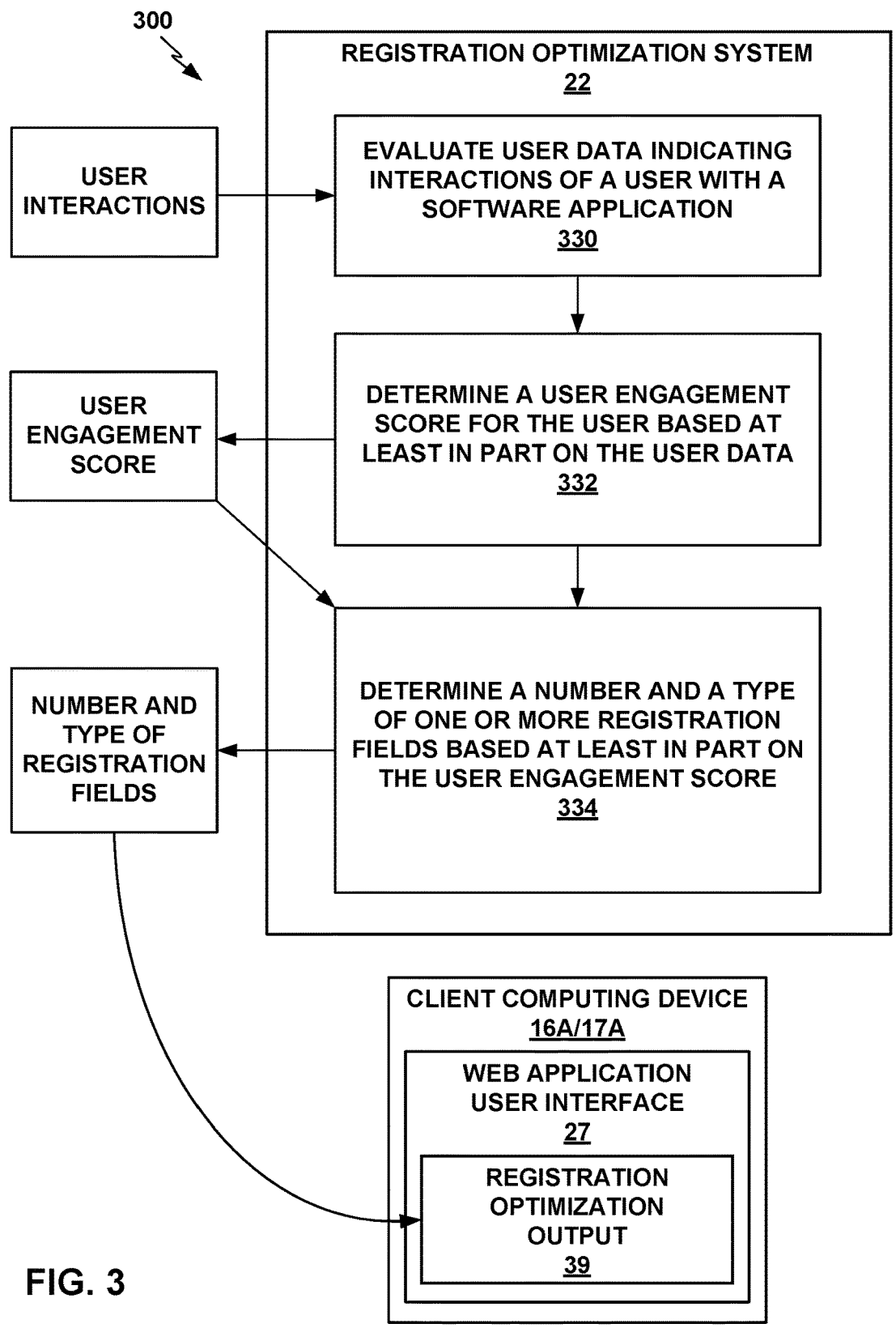
FIG. 3 shows a flowchart of a registration optimization system configured to output a number and type of registration fields, in some examples of this disclosure.

FIG. 3 shows a flowchart of a registration optimization system 22 configured to output a number and type of registration fields to registration optimization output 39, in some examples of this disclosure. Registration optimization system 22 may include one or more steps, such as evaluating user data indicating the interactions of a user with a software application (330). Registration optimization system 22 may determine a user engagement score for the user based at least in part on the user data (332). Registration optimization system 22 may determine, based at least in part on the user engagement score, a number and a type of registration fields (334). Registration optimization system 22 may output the number and types of registration fields to registration optimization output 39 in web application UI 27 for display at client computing device 16A/17A.

Registration optimization output 39 may display the registration fields to a user based on the occurrence of a triggering event. Triggering events may include detection of any of a selected set of user inputs indicative of certain levels of user interest. For example, triggering events may include detection of a user input on a selected link indicative of a selected user engagement such as a link for a free software trial, an email newsletter, or a request for assistance. Triggering events may also include a user clicking on a specific link for a free software trial, an email newsletter, or a request for assistance. Triggering events may also include detection of a user input in a forum, such as the user submitting a question or reply in the forum. A forum may be any web application, website, or any other interface in which the user may enter communications intended for interaction with the operators and/or other users of the forum. For example, a forum may include a comments sections of a blog post, an embedded third-party commenting widget or application, or other communications means in addition to explicitly identified forums. Triggering events may also include detection of a user spending a certain amount of time on a website.

Registration optimization system 22 may define a triggering event based on registration data indicating abandonment rates and/or other registration abandonment behavior patterns of prior users. When a triggering event occurs, registration optimization output 39 may display the registration fields and request customer data from a user. Displaying registration optimization output 39 based on a triggering event may achieve a higher success rate, especially if registration optimization system 22 chooses the triggering events based on registration data indicating past abandonment rates and/or other registration abandonment behavior patterns.

Figure 4:
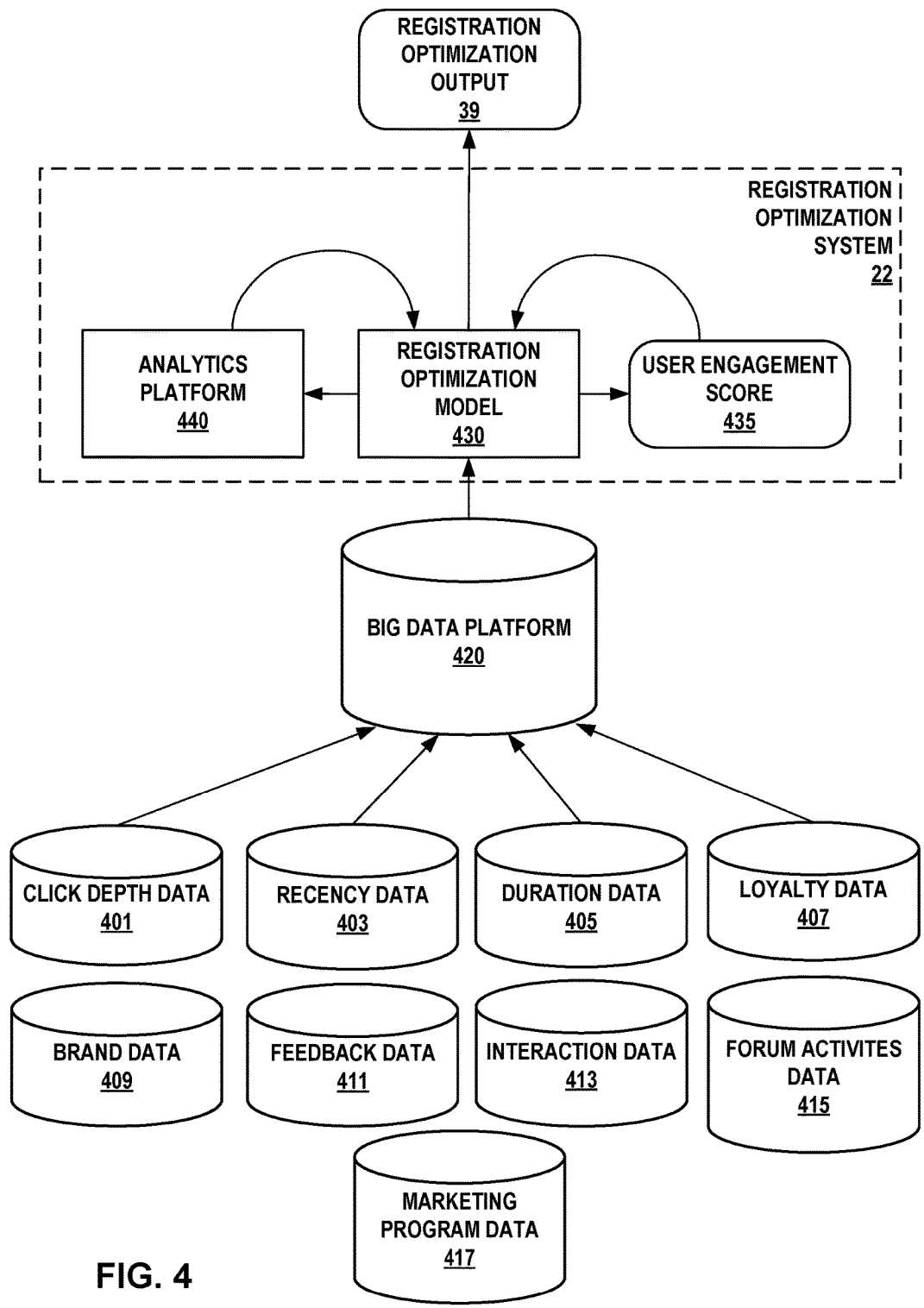
FIG. 4 shows a conceptual block diagram illustrating components used to generate a user engagement score and determine a number and type of registration fields, in some examples of this disclosure.

FIG. 4 shows a conceptual block diagram illustrating components used to generate a user engagement score and determine a number and type of registration fields, in some examples of this disclosure. FIG. 4 depicts nine data stores that registration optimization system 22 may query to determine user engagement score 435. Registration optimization system 22 may determine user engagement score 435 by applying registration optimization model 430 to the data received from big data platform. Registration optimization system 22 may calibrate registration optimization model 430 using analytics platform 440, which may include a machine learning algorithm applied to registration data indicating the registration abandonment behavior patterns of prior users, such as registration abandonment rates and user behavior between beginning and abandoning a user registration process. The abandonment rate may be defined as the percentage of users that do not complete the registration process, which is the opposite of the registration rate. Registration optimization system 22 may then generate registration optimization output 39 based at least in part on user engagement score 435. Registration optimization output 39 may display a number and a type of registration fields, as determined by registration optimization system 22.

Registration optimization system 22 may use a machine learning algorithm to determine the number and types of registration fields to display. For example, if previous users were more willing to provide their email address than their phone number, registration optimization system 22 may request an email address at a higher frequency than a phone number. Registration optimization system 22 may also consider other factors, such as the relative values of user phone numbers compared to user email addresses. For example, if contacting a user by phone has a higher sales conversion rate than contacting a user by email, registration optimization system 22 may request a phone number at a higher frequency than an email address. Similarly, registration optimization system 22 may also consider what percentage of users that download free software trials go on to activate the software. Registration optimization system 22 may also consider how what percentage of users that activate the free software go on to purchase the full version of the software.

Similarly, registration optimization system 22, through analytics platform 440, may calibrate registration optimization model 430 to increase or decrease the weight of data stores 401-417 depending on the experience of previous users. For example, if users with high click depth subscores completed the registration process at a relatively high rate in the past, analytics platform 440 may assign a higher weight to click depth data 401 within registration optimization model 430.

Big data platform 420 may query nine data stores 401-417 and may provide data to registration optimization system 22. Data stores 401-417 are not mutually exclusive because there may be overlap between the content of each of data stores 401-417. Click depth data 401 may include the number of sessions having more than N page views divided by the total number of sessions for the user. Click depth data 401 may include the percentage of sessions that a user clicks deeply into a website. Recency data 403 may include the number of sessions having more than N page views that occurred in the past K weeks, divided by the total number of sessions for the user. Registration optimization system 22 may adjust the values of N and K for any of the indices, depending on the preferences of the software provider. Duration data 405 may include the number of sessions for the user that exceed N minutes, divided by the total number of sessions for the user. Loyalty data 407 may include the number of times that a user has visited a website for a specified time period. Therefore, a user has a high loyalty index if the user consistently returns to the website. Brand data 409 may include the number of sessions for a user that either begin directly at a website without a referring web address or are initiated by an external search for a branded term, divided by the number of sessions for the user. Brand data 409 may include the percentage of sessions for which a visitor arrives at a website as the result of a branded action. Feedback data 411 may include the number of sessions during which the user gave direct feedback divided by number of sessions for the user. Feedback data 411 qualitatively measures the user's engagement. Interaction data 413 may include the number of sessions during which a user completed a specific tracked events divided by the number of sessions for the user. Interaction data 413 may include the percentage of visits that resulted in a mini-conversion, such as subscribing to an email newsletter or downloading content.

Forum activities data 415 may include the frequency at which a user posts and replies to questions in website forums. In some examples, registration optimization system 22 may assign three points to searching for keywords in a forum, five points for posting a question, one point for replying to a question, and one point for viewing questions and answers, for a total of ten points. Registration optimization system 22 may divide the total forum activities subscore by ten to arrive at the forum activities index. Marketing program data 417 may compare the conversion rate for a specific marketing program or traffic type to the average conversion rate for all marketing programs. For example, if the conversion rate for paid search engine advertising is 0.03% and the average conversion rate is 1.0%, the marketing program subscore for paid search engine advertising may be 0.03. Other data categories may include data from web analytics tools relating to user source such as user tracking and user identification. User source data may allow registration optimization system 22 to track user navigation both inside and outside of the website or software application. Other data categories may relate to user interest in certain products or whether a user needs assistance. Registration optimization system 22 may use any demographic data that is available from web analytics tools, cookies, IP addresses, or other sources.

Registration optimization system 22 may apply analytics platform 440 to registration optimization model 430 to determine a desirable balance of abandonment rate and the number and type of registration fields. Analytics platform 440 may use machine learning algorithms such as logistic regression classifier and Bayes algorithms to adjust registration optimization model 430. In some examples, analytics platform 440 may separate the number of registration fields into various groups. Analytics platform 440 may calculate registration abandonment behavior pattern data such as a range of user engagement scores and a range of abandonment rates for each group of registration fields. Analytics platform 440 may compare the ranges of user engagement scores and the ranges of abandonment rates for groups with the same number of registration fields. Analytics platform 440 may compare the different registration fields in the groups and assign a corresponding weight for each registration field. Analytics platform 440 may compare the overlapping user engagement score range and the abandonment range between the two registration field groups and then compare the difference between the two groups.

For example, if group 1 has three registration fields and group 2 has the same three registration fields and an additional fourth registration field, the difference in abandonment rates between the two groups may be attributable to the fourth registration field. Analytics platform 440 may assign a score to each registration field based on the above-described analysis. If two groups of registration fields differ by one registration field, a difference in abandonment rates may not always be attributable to the one registration field. Instead, the difference in abandonment rates may be due to external factors or simply based on a small sample size. In order to determine the cause of the difference in abandonment rates, analytics platform 440 may monitor the abandonment rates of both groups of registration fields going forward.

In some examples, if previous users with high click depth subscores were relatively more likely to complete the registration process, analytics platform 440 may assign a higher weight to click depth data 401 within registration optimization model 430. The higher weight for click depth data 401 may increase the influence of the click depth sub score on the determination of user engagement score 435. A user with a relatively high click depth subscore may therefore have a relatively high user engagement score 435, and registration optimization model 430 may direct registration optimization output 39 to display a relatively high number of registration fields for the user. In contrast, for a user with a relatively low click depth subscore, registration optimization model 430 may direct registration optimization output 39 to display a lower number of registration fields.

When a new registration occurs, registration optimization model 430 may calculate the user engagement score and match it to the closest user engagement scores in the records of big data platform 420. If multiple user engagement scores match, analytics platform 440 may calculate the total registration field scores and divide the scores by the number of registration fields. Then analytics platform 440 may choose the highest weighted registration field group to display to a user. For example, for a user engagement score in a certain range, registration optimization model 430 may decide to display three registration fields. Registration optimization model 430 may select the fields based on which three fields correspond to the highest completion rate for previous users. Analytics platform 440 may use a machine learning algorithm such as a logistic regression classifier or a Bayesian approach to determine the optimal number and type of registration fields to display to a user. Other machine learning algorithms include, but are not limited to, k-nearest neighbor, k-means, naïve Bayes, and neural networks. Analytics platform 440 may also consider the correlation between completing a certain registration field and purchasing a product in the future. In that way, if providing a phone number often precedes a large purchase, registration optimization system 22 may request phone numbers more often.

Analytics platform 440 may use machine learning algorithms to determine the best combination of abandonment rate and data acquisition based on past experience. Analytics platform 440 may continually adjust registration optimization model 430 based on incoming data. Through registration optimization model 430, analytics platform 440 may experiment with different groupings of registration fields to test hypotheses and search for better groupings. Even if analytics platform 440 determines an optimal grouping, analytics platform 440 may continue to experiment with groupings because it is possible that user preferences may shift over time and across geography. For example, users in some regions or countries may be more willing to provide a phone number than users in other regions or countries. Similarly, users on a smartphone or tablet may be more willing to provide a phone number than other users. In that event, if registration optimization system 22 determines that a user is on a tablet, registration optimization system 22 may increase the probability that registration optimization output 39 requests a phone number from the user. In this way, registration optimization system 22 is flexible, evolutionary, and data-driven.

FIG. 5 depicts a screenshot of an example registration optimization output 39 that includes several registration field boxes 510, in some examples of this disclosure. Client computing device 16A/17A may display web application user interface (UI) 27, which may include registration optimization output 39. Web application UI 27 may appear on a user's computer monitor, laptop, tablet, smartphone, or other display device. Registration optimization output 39 may contain one or more registration field boxes 510 that request customer data from a user. In some examples, registration optimization output 39 may display registration field boxes 510A-510L for first name, last name, email address, phone number, company, title, country, job title, company size, referral source, and industry segment. Web application UI 27 may display text and hyperlinks in registration optimization output 39 alongside registration field boxes 510. Text and hyperlinks in registration optimization output 39 may prompt the user to provide the requested information.

Registration optimization output 39 may display text indicating the type of each registration field box 510 inside or outside of registration field boxes 510. In some examples, registration optimization output 39 displays "first name" inside registration field box 510A and "country" outside registration field box 510G. Registration optimization output 39 may allow a user to provide customer data by typing text into registration field boxes 510. When a user selects registration field box 510A, the default text, such as "first name," may disappear, allowing the user to enter customer data into registration field box 510A.

Registration optimization system 22 may determine the type and number of registration field boxes 510A-510L to display based on a user engagement score. The determination of a user engagement score may be based on the interactions of a user with web application UI 27, including other webpages, web applications, or enterprise applications. Registration optimization system 22 may generate the design and layout of registration optimization output 39 after registration optimization system 22 determines the number and type of registration field boxes 510 to display.

Registration optimization system 22 may adopt one of many strategies. In some examples, registration optimization system 22 may display a lower number of registration fields to a user with a lower user engagement score. If registration optimization output 39 has a relatively low number of registration fields, the user may be more likely to complete the registration process. On the other hand, there may be benefits to displaying a higher number of registration fields to a user with a lower user engagement score. A relatively high number of registration fields may impose more qualifying on users with lower engagement. With respect to a user with a high user engagement score, registration optimization output 39 may contain fewer registration fields because it may be very likely that the user will provide additional information in the future if requested by registration optimization output 39.

Web application UI 27 may display registration optimization output 39 to a user when a triggering event occurs. A triggering event includes when the user clicks a hyperlink to download a free software trial, a research paper, or to watch a demonstration video. Web application UI 27 may display registration optimization output 39 in response to other triggering events, such as when a user has spent twenty minutes on the website, when a user has a high interest level in certain products, or when a user communicates a need for assistance. Moreover, web application UI 27 may offer the user a free webinar that requires completing a registration form. If registration optimization output 39 determines that certain triggering events lead to high abandonment rates, registration optimization output 39 may decide not to request any information after such a triggering event occurs. Registration optimization system 22 may monitors for triggering events to decide when to display registration optimization output 39.

In some examples, registration optimization output 39 may request information from a user on more than one occasion. If the user already completed the registration process, registration optimization output 39 may display different registration fields for the second request. For the second request, registration optimization output 39 may use the scores for each individual registration field, rather than the group scores because the group scores may be associated with customer data that the user has already provided.

Figure 6:
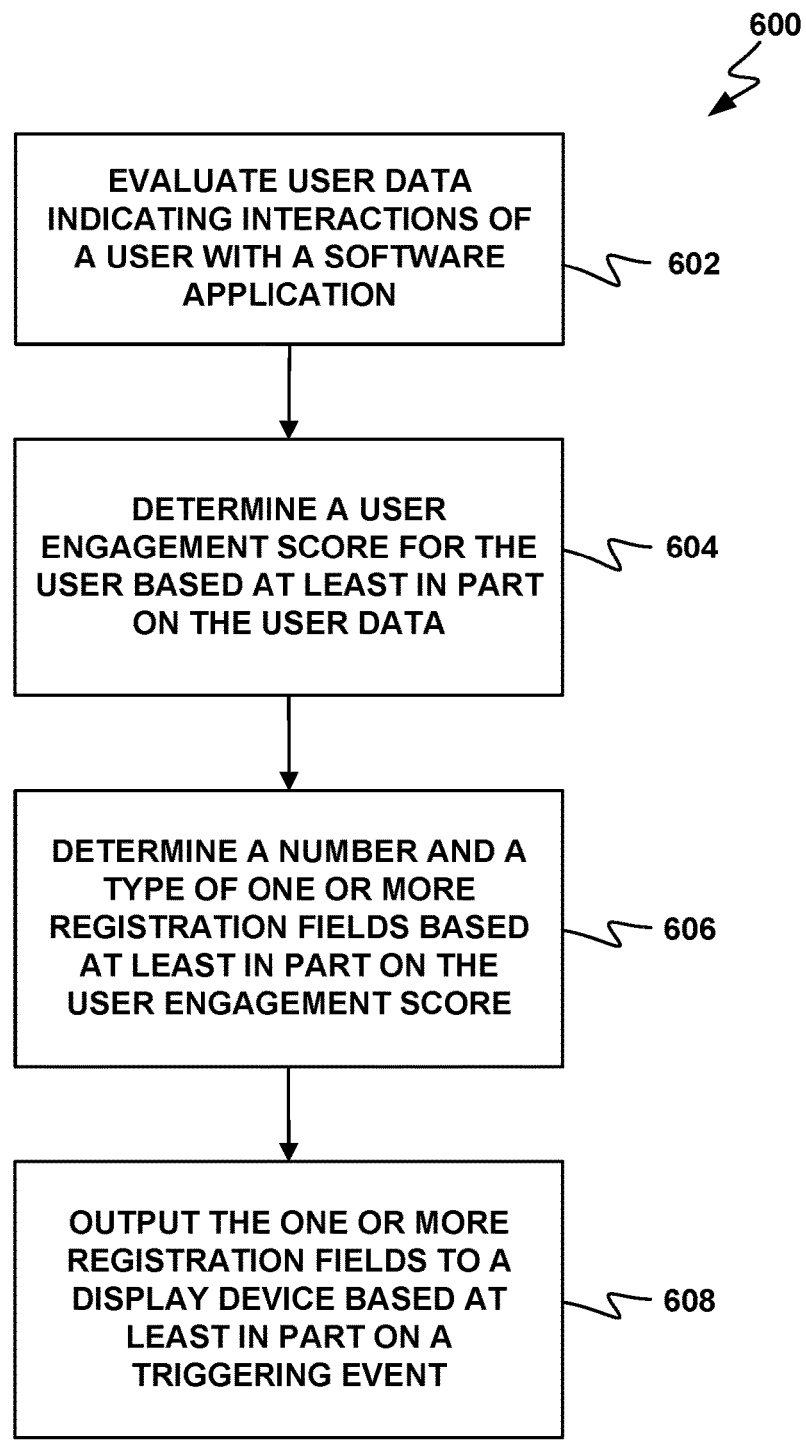
FIG. 6 depicts a flowchart of an example process that registration optimization system, executing on one or more computing devices (e.g., servers, computers, processors, etc.), may perform, in some examples of this disclosure.

FIG. 6 depicts a flowchart of an example process that registration optimization system, executing on one or more computing devices (e.g., servers, computers, processors, etc.), may perform, in some examples of this disclosure. Process 600 may include evaluating user data indicating interactions of a user with a software application (602). Process 600 may further include determining a user engagement score for the user based at least in part on the user data (604). Process 600 may further include determining, based at least in part on the user engagement score, a number and a type of one or more registration fields (606). Process 600 may further include outputting the one or more registration fields to a display device based at least in part on a triggering event (608). Various implementations of process 600 may also include any of the processes described above.

Figure 7:
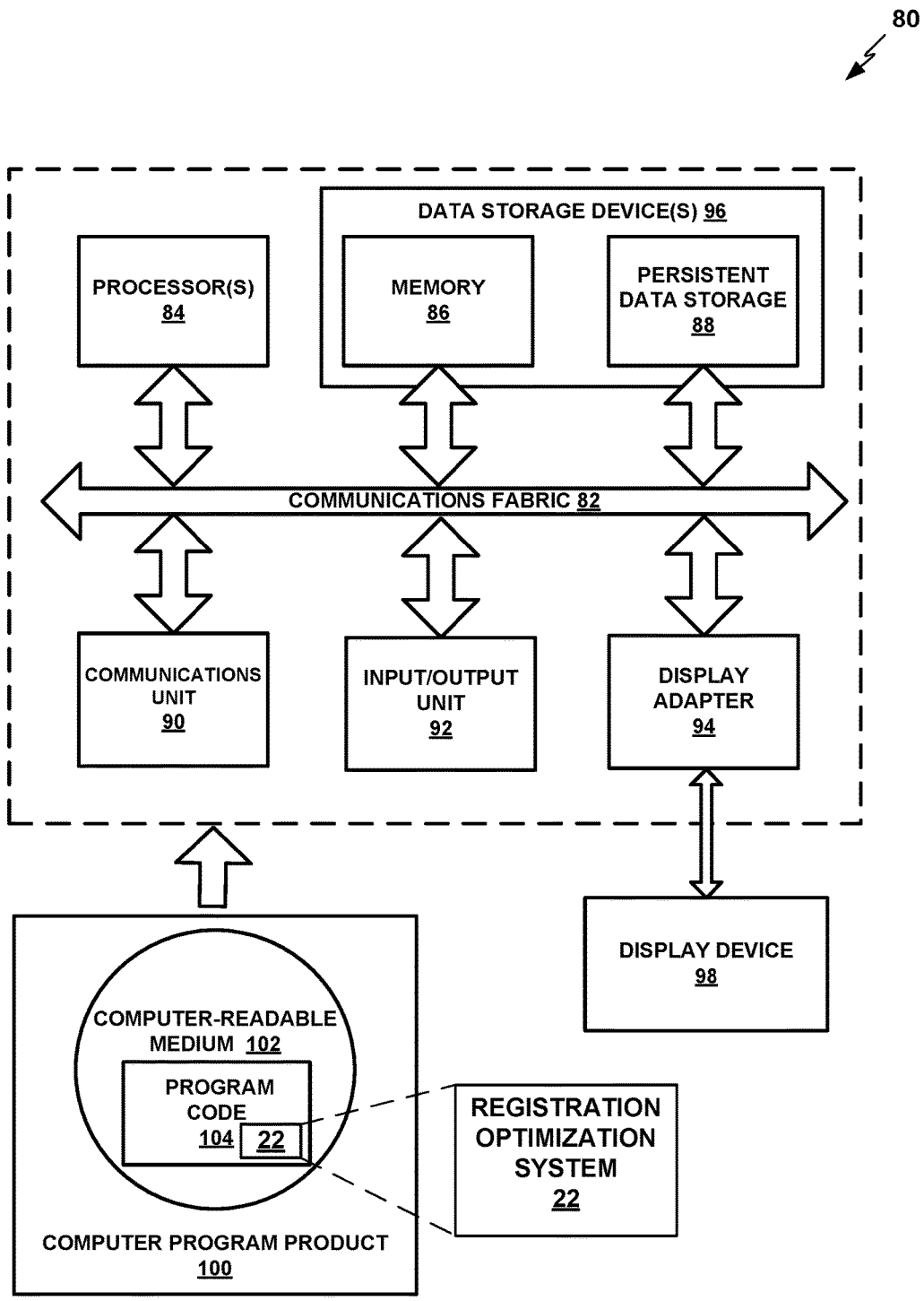
FIG. 7 is a block diagram of a computing device that may be used to execute a software component build system, in some examples of this disclosure.

FIG. 7 is a block diagram of a computing device 80 that may be used to execute a registration optimization system 22, in one aspect of this disclosure. Computing device 80 may be a server such as one of application servers 14B as depicted in FIG. 2. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 7, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may include one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage mediums. Persistent data storage 88 may store computer-executable instructions or computer-readable program code for an operating system, application files including program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical computer-readable data storage devices. Data storage 96 may include any of various forms of volatile memory that may require being periodically electrically refreshed to maintain data in memory, while those skilled in the art will recognize that this also constitutes an example of a physical computer-readable data storage device. Executable instructions may be stored on a physical medium when program code is loaded, stored, relayed, buffered, or cached on a physical medium or device, including if only for only a short duration or only in a volatile memory format.

Processor unit 84 can also be suitably programmed to read, load, and execute computer-executable instructions or computer-readable program code for a registration optimization system 22, as described in greater detail above. This program code may be stored on memory 86, persistent data storage 88, or elsewhere in computing device 80. This program code may also take the form of program code 104 stored on computer-readable medium 102 included in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which includes a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions included in program code 104.

In some illustrative examples, program code 104 may be downloaded over a network to data storage 96 from another device or computer system for use within computing device 80. Program code 104 including computer-executable instructions may be communicated or transferred to computing device 80 from computer-readable medium 102 through a hard-line or wireless communications link to communications unit 90 and/or through a connection to input/output unit 92. Computer-readable medium 102 including program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over mediums, such as communications links or wireless transmissions containing the program code 104. Program code 104 may be more or less temporarily or durably stored on any number of intermediate physical computer-readable devices and mediums, such as any number of physical buffers, caches, main memory, or data storage components of servers, gateways, network nodes, mobility management entities, or other network assets, en route from its original source medium to computing device 80.

The present invention may be a system, a method, and/or a computer program product at any possible technical level of integration. The computer program product may include a computer readable storage medium (or mediums) having computer readable program instructions thereon for causing a processor to carry out aspects of the present invention.

The computer readable storage medium may be a device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission mediums (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

querying, with one or more processing devices, one or more data stores for user-specific data indicating interactions of a particular user with a software application;

applying, with the one or more processing devices, a registration optimization model to the user-specific data to determine a user-specific engagement score for the particular user;

determining, with the one or more processing devices, based at least in part on the user-specific engagement score, a number of registration fields to be generated for the particular user and a respective type for each registration field to be generated for the particular user;

generating, with the one or more processing devices, based at least in part on the user-specific engagement score, a user-specific registration optimization output to be output in a user interface, the user-specific registration optimization output comprising one or more registration fields for the software application, wherein the one or more registration fields include a number of registration fields equal to the number of registration fields determined to be generated for the particular user, and wherein a respective type for each registration field of the one or more registration fields corresponds to the respective type for each registration field determined to be generated for the particular user; and outputting, with the one or more processing devices to a display device and for the particular user, based at least in part on a triggering event, the user-specific registration optimization output in the user interface on the display device.

2. The method of claim 1, further comprising:

querying, with the one or more processing devices, registration data indicating abandonment rates of prior users, wherein generating the user-specific registration optimization output comprises applying, with the one or more processing devices, registration optimization model to the user-specific data and the registration data.

3. The method of claim 1, wherein the user-specific data indicates multi-factor data comprising user interests for the particular user, user needs for the particular user, and user source for the particular user, and wherein generating the user-specific registration optimization output comprises applying, with the one or more processing devices to the multi-factor data, the registration optimization model that specifies respective weights for factors of the multi-factor data.

4. The method of claim 3, further comprising:

applying a machine learning algorithm to registration data indicating registration abandonment behavior patterns of prior users; and using an output from the machine learning algorithm based on the registration abandonment behavior patterns of the prior users to determine the respective weights for factors of the multi-factor data.

5. A computer program product comprising a non-transitory computer-readable storage medium having program code embodied therewith, the program code executable by a computing device to:

query one or more data stores for user-specific data indicating interactions of a particular user with a software application;

apply a registration optimization model to the user-specific data to determine a user-specific engagement score for the particular user;

determine, based at least in part on the user-specific engagement score, a number of registration fields to be generated for the particular user and a respective type for each registration field to be generated for the particular user;

generate, based at least in part on the user-specific engagement score, a user-specific registration optimization output to be output in a user interface, the user-specific registration optimization output comprising one or more registration fields for the software application, wherein the one or more registration fields include a number of registration fields equal to the number of registration fields determined to be generated for the particular user, and wherein a respective type for each registration field of the one or more registration fields corresponds to the respective type for each registration field determined to be generated for the particular user; and output, to a display device and for the particular user, based at least in part on a triggering event, the user-specific registration optimization output in the user interface on the display device.

6. The computer program product of claim 5, wherein the program code is further executable by the computing device to:

query registration data indicating abandonment rates of prior users, wherein the program code is executable by the computing device to generate the user-specific registration optimization output by being executable by the computing device to apply the registration optimization model to the user-specific data and the registration data.

7. The computer program product of claim 5, wherein the user-specific data indicates multi-factor data comprising user interests for the particular user, user needs for the particular user, and user source for the particular user, and wherein the program code is executable by the computing device to generate the user-specific registration optimization output by being executable by the computing device to apply, to the multi-factor data, the registration optimization model that specifies respective weights for factors of the multi-factor data.

8. The computer program product of claim 7, wherein the program code is further executable by the computing device to:

apply a machine learning algorithm to registration data indicating registration abandonment behavior patterns of prior users; and use an output from the machine learning algorithm based on the registration abandonment behavior patterns of the prior users to determine the respective weights for factors of the multi-factor data.

9. A computer system comprising:

one or more processors, one or more computer-readable memories, and one or more computer-readable storage mediums;

program instructions, stored on at least one of the one or more storage mediums for execution by at least one of the one or more processors via at least one of the one or more memories, to query one or more data stores for user-specific data indicating interactions of a particular user with a software application;

program instructions, stored on at least one of the one or more storage mediums for execution by at least one of the one or more processors via at least one of the one or more memories, to apply a registration optimization model to the user-specific data to determine a user-specific engagement score for the particular user;

program instructions, stored on at least one of the one or more storage mediums for execution by at least one of the one or more processors via at least one of the one or more memories, to determine, based at least in part on the user-specific engagement score, a number of registration fields to be generated for the particular user and a respective type for each registration field to be generated for the particular user;

program instructions, stored on at least one of the one or more storage mediums for execution by at least one of the one or more processors via at least one of the one or more memories, to generate, based at least in part on the user-specific engagement score, a user-specific registration optimization output to be output in a user interface, the user-specific registration optimization output comprising one or more registration fields for the software application, wherein the one or more registration fields include a number of registration fields equal to the number of registration fields determined to be generated for the particular user, and wherein a respective type for each registration field of the one or more registration fields corresponds to the respective type for each registration field determined to be generated for the particular user; and program instructions, stored on at least one of the one or more storage mediums for execution by at least one of the one or more processors via at least one of the one or more memories, to output, to a display device and for the particular user, based at least in part on a triggering event, the user-specific registration optimization output in the user interface on the display device.

10. The computer system of claim 9, further comprising program instructions, stored on at least one of the one or more storage mediums for execution by at least one of the one or more processors via at least one of the one or more memories, to:

query registration data indicating abandonment rates of prior users; and apply the registration optimization model to the user-specific data and the registration data.

11. The computer system of claim 9, wherein the user-specific data indicates multi-factor data comprising user interests for the particular user, user needs for the particular user, and user source for the particular user, and wherein the computer system further comprises program instructions, stored on at least one of the one or more storage mediums for execution by at least one of the one or more processors via at least one of the one or more memories, to apply, to the multi-factor data, the registration optimization model that specifies respective weights for factors of the multi-factor data.

12. The computer system of claim 11, further comprising program instructions, stored on at least one of the one or more storage mediums for execution by at least one of the one or more processors via at least one of the one or more memories, to:

apply a machine learning algorithm to registration data indicating registration abandonment behavior patterns of prior users; and use an output from the machine learning algorithm based on the registration abandonment behavior patterns of the prior users to determine the respective weights for factors of the multi-factor data.

* * * * *